US006459982B1

United States Patent
Kobayashi et al.

(10) Patent No.: US 6,459,982 B1
(45) Date of Patent: Oct. 1, 2002

(54) PRECEDING VEHICLE FOLLOWING CONTROL SYSTEM

(75) Inventors: Yosuke Kobayashi; Hideaki Inoue, both of Yokohama; Youji Seto, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/619,629

(22) Filed: Jul. 19, 2000

(30) Foreign Application Priority Data

Jul. 19, 1999 (JP) ............................................ 11-204274

(51) Int. Cl.[7] .................................................. G06F 7/00
(52) U.S. Cl. ............................ 701/93; 701/96; 180/170; 340/436
(58) Field of Search ...................... 701/93, 96; 180/169, 180/170; 340/435, 436

(56) References Cited

U.S. PATENT DOCUMENTS 5,549,369 A    8/1996   Rump et al. ................. 303/125
5,695,020 A   12/1997   Nishimura ................... 180/169
5,959,572 A    9/1999   Higashimata et al. ......... 342/70
6,009,368 A * 12/1999   Labuhn et al.
6,076,622 A *  6/2000   Chakraborty et al.
6,119,068 A *  9/2000   Kannonji
6,122,588 A *  9/2000   Shehan

FOREIGN PATENT DOCUMENTS

JP           8-175221        7/1996

* cited by examiner

Primary Examiner—William A. Cuchlinski, Jr.
Assistant Examiner—Edward Pipala
(74) Attorney, Agent, or Firm—Foley & Lardner

(57) ABSTRACT

A preceding vehicle following control apparatus includes a sensor sensing an actual vehicle speed, a sensor sensing an actual vehicle spacing from a controlled vehicle to a preceding vehicle ahead, and an actuator for regulating a driving/braking force of the controlled vehicle. A controller controls the vehicle speed or the vehicle spacing in a following control mode with the actuator, and starts a deceleration control if an anti-lock brake control is started in the following control mode. The controller cancels the deceleration control when the vehicle spacing becomes greater than a predetermined spacing value.

15 Claims, 4 Drawing Sheets

PRECEDING VEHICLE FOLLOWING CONTROL SYSTEM

BACKGROUND OF THE INVENTION

The present invention relates to preceding vehicle following control technique for controlling an actual vehicle spacing or distance to a preceding vehicle and a vehicle speed, and specifically to control technique for controlling the actual vehicle spacing to a desired spacing in the presence of a captured preceding vehicle ahead and controlling the actual vehicle speed to a desired vehicle speed in the absence of a captured preceding vehicle.

A Japanese Patent Kokai Publication H8(1996)175221 shows a constant speed travel control system associated with an antilock brake control system.

SUMMARY OF THE INVENTION

If a preceding vehicle following control system employs a strategy of canceling a constant speed travel mode in response to a depression of a brake pedal, resuming the constant speed travel mode normally upon release of the brake pedal, and preventing a return to the constant speed travel mode even after a release of the brake pedal when the anti-lock brake system become active, there arises a problem in the case of an automatic inching operation for controlling the vehicle spacing until the vehicle speed is reduced to zero. If, after a start of the anti-lock brake control operation, a preceding vehicle slackens its deceleration in a vehicle speed region close to stoppage, the controlled vehicle stops deceleration and hence the following control is canceled. Therefore, even if the preceding vehicle is decelerated again, an automatic braking operation is not effected, and a driver's braking operation is needed in some cases.

It is therefore an objective of the present invention to provide preceding vehicle following control apparatus and/or process for continuing a deceleration control after activation of an anti-lock brake control, without need for driver's intervention.

According to the present invention, a preceding vehicle following control apparatus for controlling a controlled vehicle comprises:
 a vehicle speed sensor to sense an actual vehicle speed of the controlled vehicle;
 a vehicle spacing sensor to sense an actual vehicle spacing from the controlled vehicle to a preceding vehicle;
 a vehicle speed controller to vary the actual vehicle speed of the controlled vehicle in accordance with a desired vehicle speed;
 an anti-lock brake controller to perform an anti-lock brake control for preventing wheel locking; and
 a vehicle speed controller to determine the desired vehicle speed V* in accordance with the actual vehicle speed and the actual vehicle spacing, the controller comprising,
  a following control section to perform a preceding vehicle following control by setting a desired vehicle spacing from the controlled vehicle to a preceding vehicle in accordance with the actual vehicle speed and actual vehicle spacing and determining the desired vehicle speed to bring actual vehicle spacing closer to the desired spacing,
  a deceleration control section to perform a deceleration control determining the desired vehicle speed to decrease the actual vehicle speed of the controlled vehicle, and
  a mode change control section to cancel the following control of the following control section and instead initiating the deceleration control of the deceleration control section in response to a start of the anti-lock brake control of the anti-lock brake control device.

According to another aspect of the present invention, a preceding vehicle following control apparatus comprises: first means for detecting an anti-lock brake control operation for preventing wheel locking of the controlled vehicle; second means for performing a preceding vehicle following control for reducing a deviation of a sensed actual vehicle spacing from the controlled vehicle to a preceding vehicle, from a desired vehicle spacing; third means for performing a deceleration control for automatically decelerating the controlled vehicle; and fourth means for starting the deceleration control when the anti-lock brake control is detected in the following control.

According to the present invention, a preceding vehicle following control process comprises: detecting an anti-lock brake control operation; performing a preceding vehicle following control when the anti-lock brake control operation is not detected; performing a deceleration control when the anti-lock brake control operation is detected; allowing the deceleration control when the sensed actual vehicle spacing is smaller than or equal to a predetermined spacing value.

DETAILED DESCRIPTION OF THE INVENTION

Figure 1:
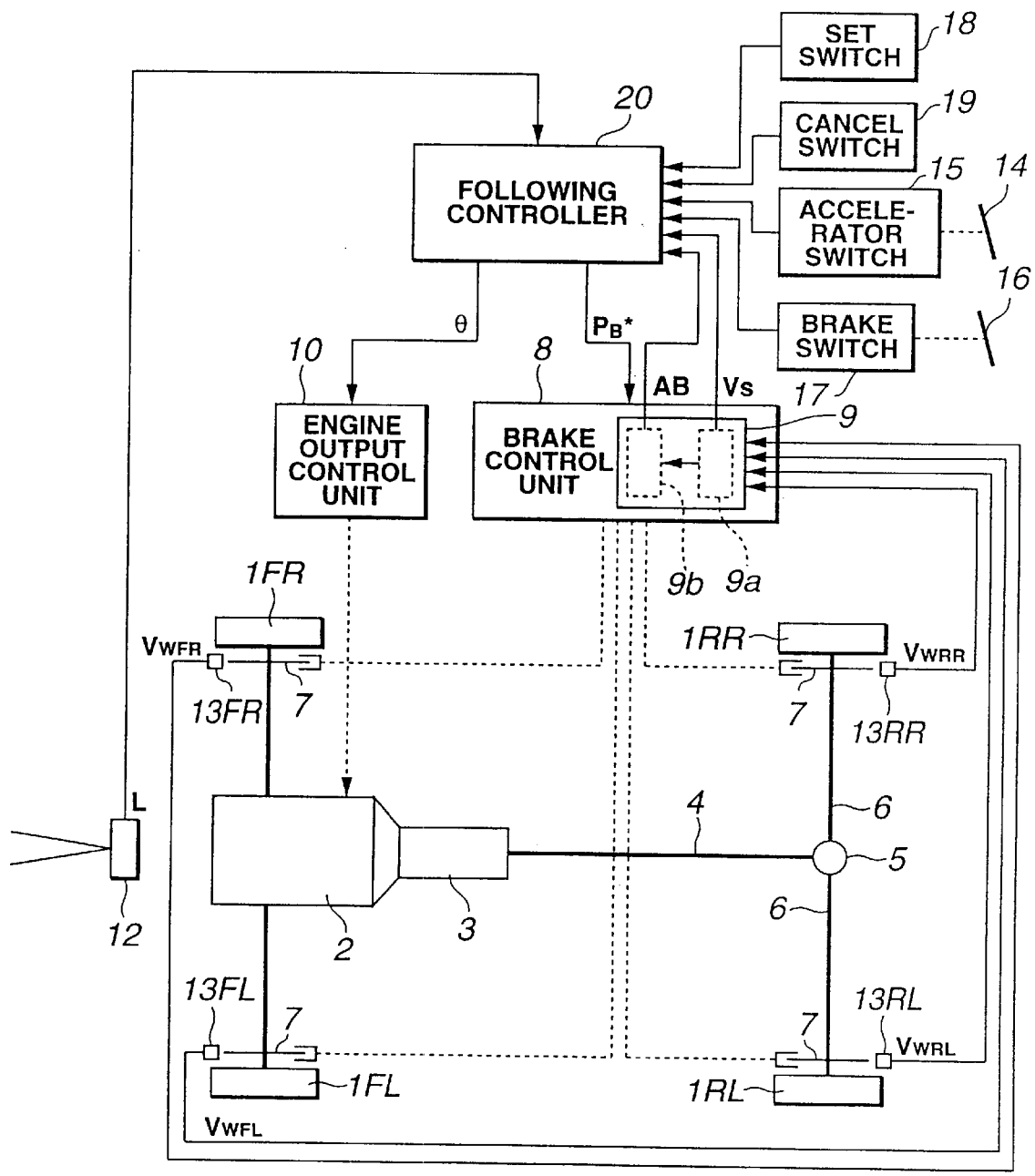
FIG. 1 is a schematic view of a preceding vehicle following control system according to one embodiment of the present invention.

FIG. 1 shows a preceding vehicle following control system according to one embodiment.

A vehicle shown in FIG. 1 is a rear wheel drive vehicle having left and right front non-drive wheels 1FL and 1FR and left and right rear drive wheels 1RL and 1RR. A driving force is transmitted to the rear wheels 1RL and 1RR from an engine 2 through an automatic transmission 3, a propeller shaft 4, a final reduction assembly 5 and left and right axle shafts 6.

Each of the four wheels is provided with a brake actuator 7, which, in the example shown in FIG. 1, includes a disc brake device. A brake control unit 8 controls a brake fluid pressure in each of the four brake actuators 7.

The brake control unit 8 produces the brake fluid pressure in accordance with depression of a brake pedal 16. Furthermore, the brake control unit 8 produces the brake fluid pressure in response to a brake control signal delivered from a following controller 20. The brake control unit 8 has an anti-lock brake control unit 9 for preventing wheel locking of each of the four wheels 1FL~1RR on braking by controlling the brake pressure to each brake actuator 7.

The anti-lock brake control unit 9 includes a vehicle body speed estimating section 9a serving as means for determining a vehicle speed, and a brake pressure controlling section 9b. The vehicle body speed estimating section 9a calculates an estimated vehicle body speed in accordance with actual wheel speeds $V_{WFL}$~$V_{WRR}$ of the four wheels 1FL~1RR sensed by wheel speed sensors 13FL~13RR. The brake pressure controlling section 9b calculates wheel slip rates in accordance with the estimated vehicle body speed and the wheel speeds $V_{WFL}$~$V_{WRR}$, and controls the brake pressure for each wheel to prevent wheel locking by increasing, decreasing or holding the master cylinder pressure in accordance with the wheel slip rate and a wheel acceleration/deceleration obtained by differentiation of the wheel speed, so as to bring the actual slip rate closer to a desired slip rate. The estimated vehicle body speed is supplied as a vehicle speed $V_s$ of the controlled vehicle from the body speed estimating section 9a to the following controller 20. The brake pressure controlling section 9b produces a brake control condition signal AB which is set equal to a logic value of "1" when the anti-lock brake control is in operation, and a logic value of "0" when the anti-lock brake control is out of operation.

An engine output control unit 10 is arranged to control the output of the engine 2. One way to control the engine output is to control the engine speed (rpm) by regulating the opening (degree) of a throttle valve for the engine 2. Another way is to control an idle speed of the engine 2 by regulating the opening of an idle control valve. In the example of FIG. 1, the engine output control unit 10 is arranged to regulate the throttle valve opening.

A vehicle spacing sensor (or distance sensor) 12 is a device for sensing a vehicle spacing (or vehicle-to-vehicle distance or separation) from the controlled vehicle (that is the vehicle equipped with this control system), to a preceding vehicle ahead. In this example, the spacing sensor 12 is a radar sensor disposed at a front lower portion of the vehicle body, and arranged to transmit laser light and receive light reflected from a preceding vehicle. The spacing sensor 12 serves as means for sensing a vehicle spacing.

The wheel speed sensors 13FL~13RR are arranged to sense the wheel speeds of the front and rear wheels 1FL~1RR, respectively. An accelerator switch 15 is arranged to detect a depression of an accelerator pedal 14 of the controlled vehicle. A brake switch 17 is a device arranged to detect a depression of the brake pedal 16. A set switch 18 serves as control start commanding means for initiating the following control. A cancel switch 19 is a device for canceling the following control.

Figure 2:
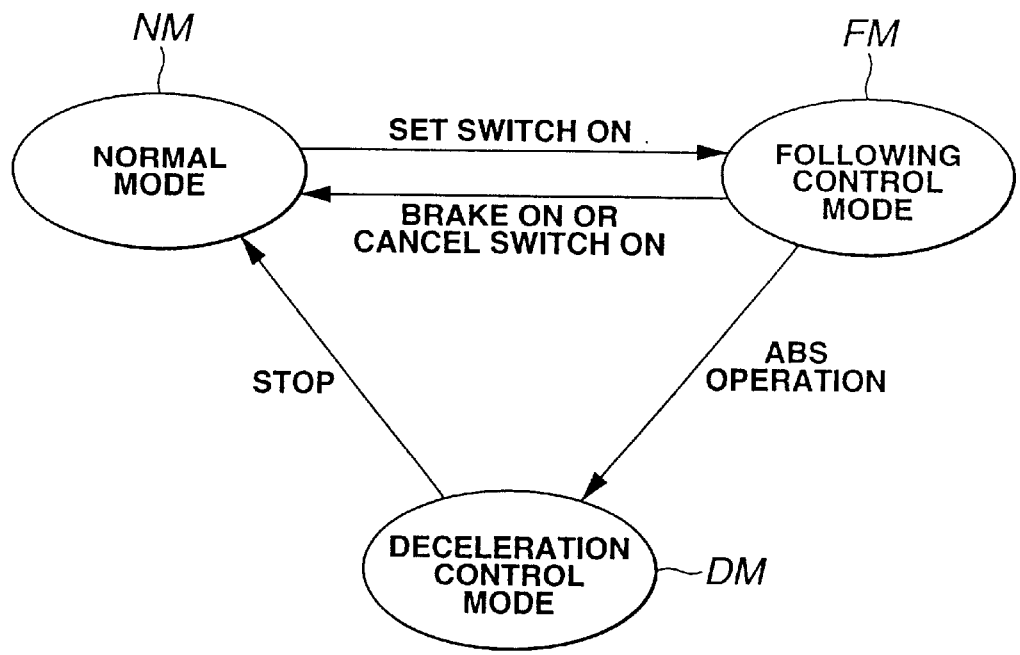
FIG. 2 is a view for illustrating transition among three different modes in the control system of FIG. 1.

The following controller 20 collects input information by receiving signals from the vehicle spacing sensor 12, the wheel speed sensors 13FL and 13FR, the accelerator switch 15, the brake switch 17, the set switch 18 and the cancel switch 19, and further receiving the vehicle speed signal representing the actual vehicle speed Vs and the control condition signal AB from the anti-lock brake control unit 9. In accordance with the input information, the following controller 20 selects one of a normal mode NM, a following control mode FM and a deceleration control mode DM, as shown in FIG. 2, and controls the vehicle in a selected one of the normal mode NM in which the following control is not performed, the following control mode FM for controlling the actual vehicle spacing to the desired spacing in the case of a preceding vehicle being captured and controlling the actual vehicle speed to the desired speed in the case of no captured preceding vehicle, and the deceleration control mode DM for performing a deceleration control when the anti-skid control system becomes operative in the following control mode FM.

When the set switch 18 is turned on in the normal mode NM in which the following control is not performed, then the following controller 20 changes the control mode from the normal mode NM to the following control mode FM. If any one of the accelerator switch 15, the brake switch 17 and the cancel switch 19 is turned on in the following control mode FM, then the control mode is changed from the following control mode FM to the normal mode NM. If the anti-lock (or anti-skid) control system is put in the operative state in the following control mode FM, then the following controller 20 changes the control mode from the following control mode FM to the deceleration control mode DM. The control mode is changed from the deceleration control mode DM to the normal mode NM if a predetermined control cancel condition, such as a stoppage of the controlled vehicle, is satisfied in the deceleration control mode DM.

Figure 3:
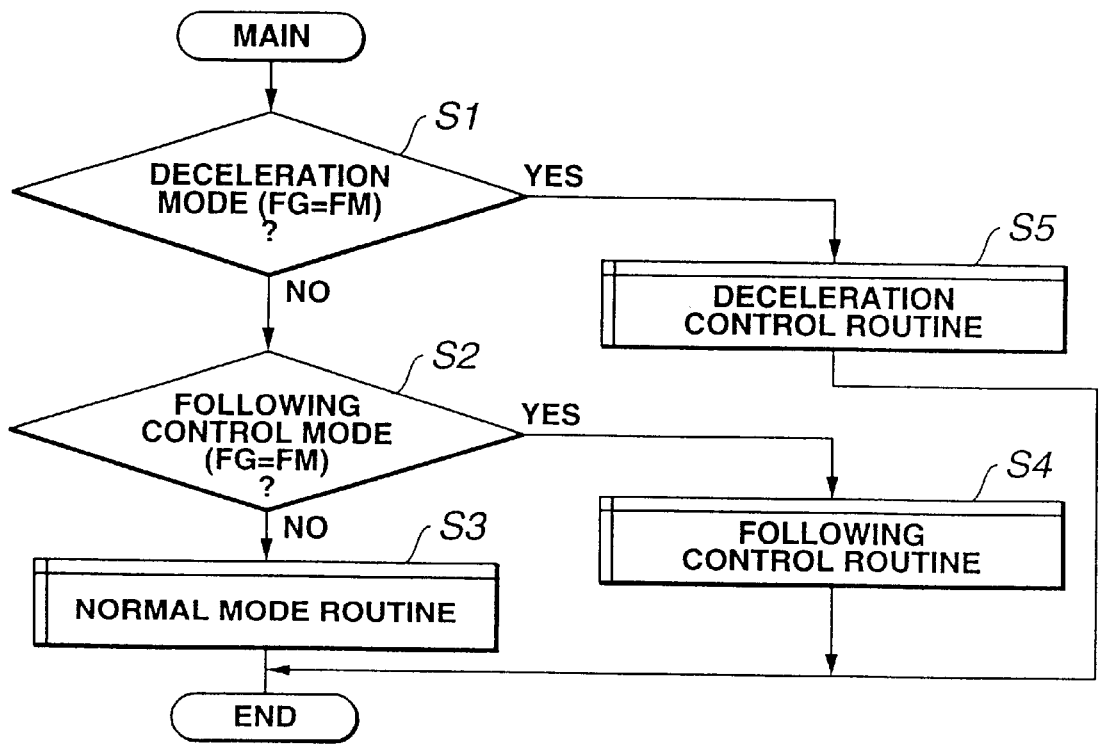
FIG. 3 is a flowchart showing a control management procedure performed by a preceding vehicle following controller in the control system of FIG. 1.

FIG. 3 shows a control procedure performed by the following controller 20. This procedure is performed as a timer interrupt routine, at regular time intervals of a predetermined time length (10 msec, for example).

At a step S1, the controller 20 checks whether the control mode is the deceleration mode DM or not, by checking whether a mode indicating flag FG is set to a DM state indicative of the deceleration mode. If FG is not equal to DM, the controller 20 proceeds from the step S1 to a step S2, and further examines whether the control mode is the following mode by checking whether the mode indicating flag FG is set to an FM state indicative of the following mode. If the current control mode is the normal mode, the flag FG is set to an NM state indicative of the normal mode, and hence the answer of the step S2 is negative, then the controller 20 proceeds to a step S3 and performs a normal mode control procedure shown in FIG. 4. Thereafter, the controller 20 terminates the procedure of FIG. 3.

Figure 5:
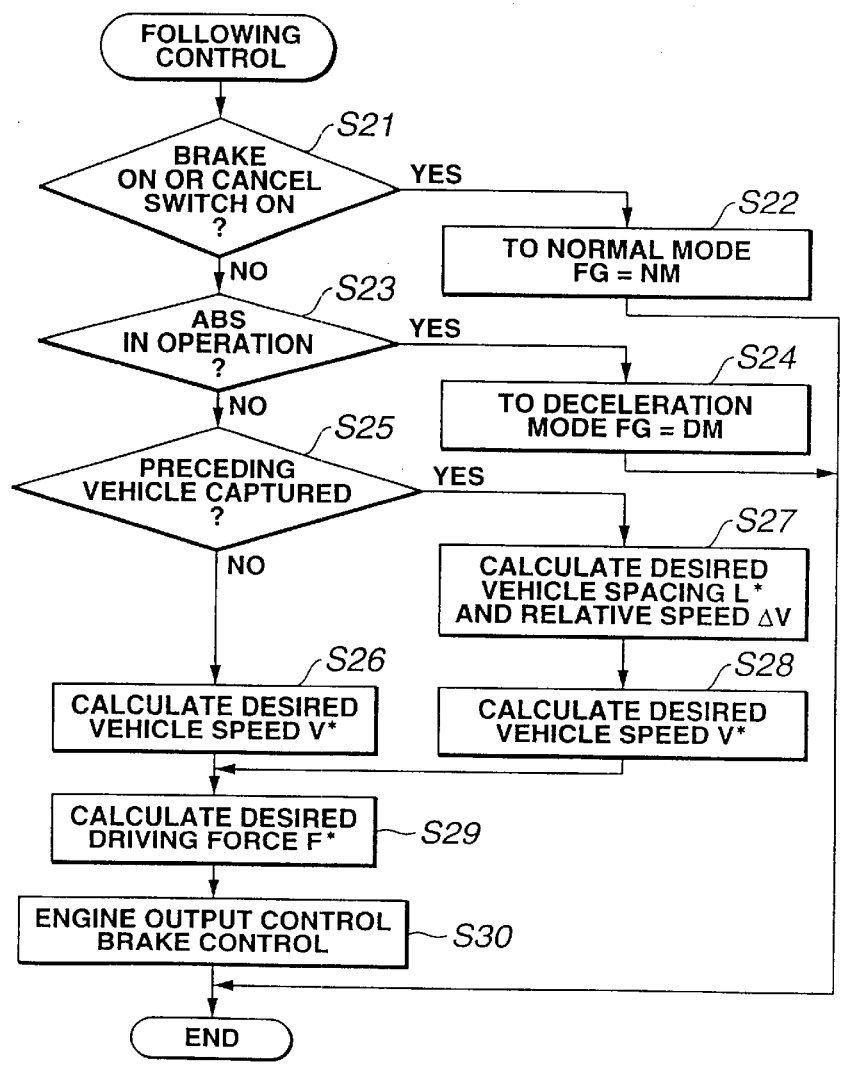
FIG. 5 is a flowchart showing a following mode routine in the procedure of FIG. 3.

If the current control mode is the following mode (FG=FM), then the controller 20 proceeds from the step S2 to a step S4, performs a following control procedure as shown in FIG. 5, and then terminates the procedure of FIG. 3.

Figure 6:
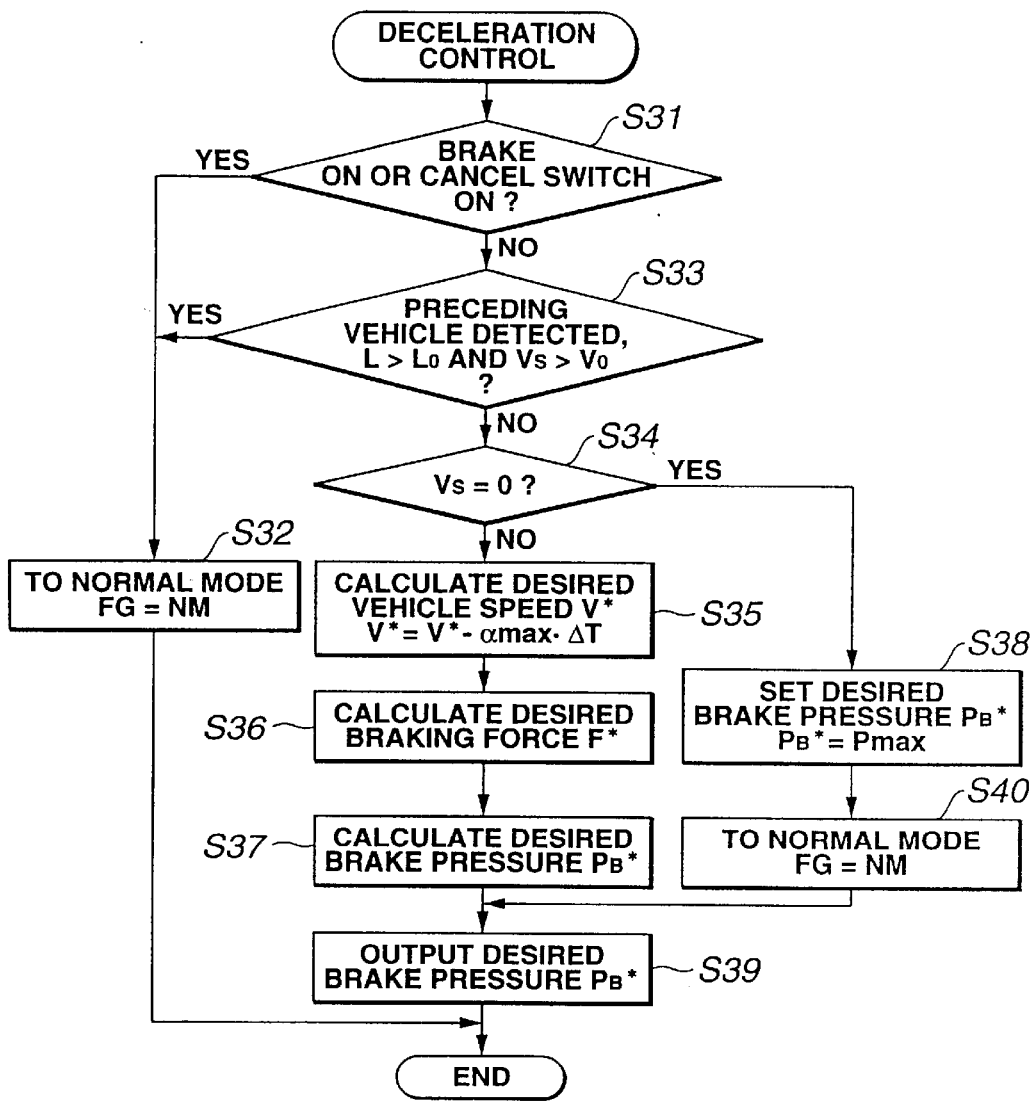
FIG. 6 is a flowchart showing a deceleration mode routine in the procedure of FIG. 3.

If the current control mode is the deceleration mode (FG=DM), then the controller 30 proceeds from the step S1 to a step S5, performs a deceleration control procedure as shown in FIG. 6, and then terminates the procedure of FIG. 3.

Figure 4:
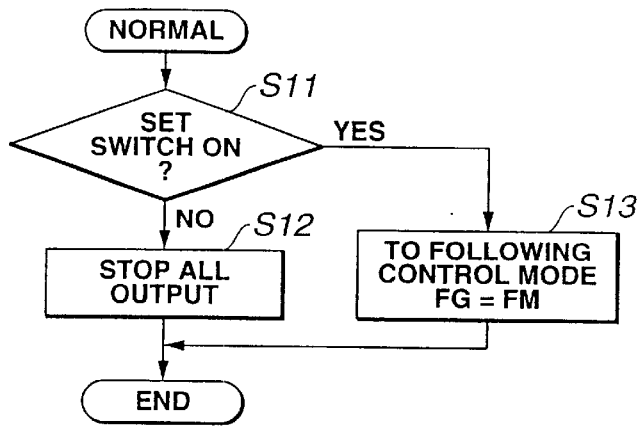
FIG. 4 is a flowchart showing a normal mode routine in the procedure of FIG. 3.

In the normal control mode procedure shown in FIG. 4, the controller 20 first examines whether the set switch 18 is in the on state or not, at a step S11. If the set switch 18 is in the off state, then the controller 20 proceeds to a step S12 and stops outputting a throttle opening degree θ and a desired brake pressure $P_B^*$ at the step S12, and then terminates the procedure of FIG. 4. If the set switch 18 is in the on state, then the controller 20 proceeds to a step S13 to initiate the following control, and sets the mode indicating flag FG to the FM state indicating the following mode at the step S13. Thereafter, the controller 20 terminates the procedure of FIG. 4.

In the following control procedure shown in FIG. 5, the controller 20 first examines whether the brake switch 17 or the cancel switch 19 is in the on state or not, at a step S21. If either or both of the brake switch 17 and the cancel switch 19 is in the on state, then the controller 20 proceeds to a step S22, sets the mode indicating flag FG to the NM state indicating the normal mode at the step S22, and then terminates the procedure of FIG. 5. If the brake switch 17 and the cancel switch 19 are both in the off state, then the controller 20 proceeds from the step S21 to a step S23.

At the step S23, the controller 20 examines whether the anti-lock brake control unit 9 is in the operative state or not, by examining whether the brake control condition signal AB supplied from the brake pressure controlling section 9b is equal to the logic one or not. If the brake control condition signal AB is equal to the logic one, the controller 20 presumes that the anti-lock brake control unit 9 is in the operative state, and proceeds to a step S24. Then, the controller 20 sets the mode indicating flag FG to the DM state indicative of the deceleration control mode at the step S24, and then terminates the procedure of FIG. 5. If the brake control condition signal is the logic zero, then the controller 20 presumes that the anti-lock brake control unit 9 is in the inoperative state, and proceeds from the step S23 to a step S25.

At the step S25, the controller 20 determines whether a preceding vehicle is captured by the vehicle spacing sensor 12, by examining whether the sensed actual vehicle spacing L is equal to or greater than predetermined value $L_{MAX}$. If there is no preceding vehicle captured in the range determined by the predetermined value $L_{MAX}$, then the controller 20 proceeds from the step S25 to a step S26, sets, as a desired vehicle speed V*, a preset vehicle speed $V_{SET}$ determined by a driver at the step S26, and proceeds to a step S29. If a preceding vehicle is captured by the vehicle spacing sensor 12, then the controller 20 proceeds from the step S25 to a step S27.

At the step S27, the controller 20 calculates a desired vehicle spacing L* from the vehicle speed $V_s$ calculated by the vehicle body speed estimating section 9a, according to an equation (1) below, and further calculates a relative speed $\Delta V$ (=(dL/dt)L) relative to a preceding vehicle by differentiating the actual vehicle spacing L sensed by the vehicle spacing sensor 12, for example, by a band-pass filtering operation or a high-pass filtering operation.

$$L^* = V_s \times T0 + Ls \qquad (1)$$

In this equation, To is a time (or time gap) required for the controlled vehicle to reach a position at a distance $L_0$ [m] from a current position of a preceding vehicle, in the rear of the preceding vehicle, and Ls is a predetermined offset value for a vehicle stop state.

At a step S28 following the step S27, the controller 20 calculates the desired vehicle speed V* from a target vehicle speed Vt of a preceding vehicle (Vt=(Vs+$\Delta V$), a spacing deviation (L*−L) and the relative speed $\Delta V$, according to an equation (2) below.

$$V^* = Vt - \{f_L(L^*-L) + fV \cdot \Delta V\} \qquad (2)$$

Then, the controller 20 sets a smaller one of this desired vehicle speed V* and the preset vehicle speed $V_{SET}$, as a final desired vehicle speed V*, and then proceeds from the step S28 to a step S29.

At the step S29, in accordance with the desired vehicle speed V* determined at the step S26 or S28, the controller 20 calculates a command driving force FOR to bring the actual vehicle speed Vs closer to the desired vehicle speed V*, and an estimated disturbance dv' by using an ordinary feedback control system and a vehicle speed servo system based on a robust model matching control technique including a model matching compensator and a robust compensator as disclosed in a U.S. Pat. No. 5,959,572 (corresponding to a Japanese Patent Kokai Publication H10 (1998)-272963), and calculates a desired driving/braking force F* by determining a difference between FOR and dv'. The entire contents of this U.S. Pat. No. 5,959,572 are herein incorporated by reference.

Then at a next step S30, in accordance with the desired driving/braking force F* calculated at the step S29, the controller 20 calculates a desired brake pressure $P_B$* and a desired throttle opening θ and delivers the brake control signal representing the desired brake pressure $P_B$* and the throttle control signal representing the desired throttle opening θ, respectively, to the brake control unit 8 and the engine output control unit 10. Thereafter, the controller 20 terminates the procedure of FIG. 5.

In the deceleration control mode procedure shown in FIG. 6, first at a step S31, the controller 20 determines whether the brake switch 17 or the cancel switch 19 is in the on state or not. If either or both of the brake switch 17 and the cancel switch 19 is in the on state, the controller 20 decides to terminate the control and proceeds to a step S32. The controller 20 sets the mode indicating flag FG to the NM state indicating the normal mode NM at the step S32, and terminates the procedure of FIG. 6. If the brake switch 17 and the cancel switch 19 are both in the off state, then the controller 20 proceeds to a step S33.

At the step S33, the controller 20 determines whether a predetermined control cancel condition is satisfied or not. In this example, the control cancel condition is satisfied if all of first, second and third conditions are satisfied. The first condition is satisfied if a preceding vehicle is captured or detected in the predetermined range by the vehicle spacing sensor 12. The second condition is satisfied if the actual spacing L sensed by the spacing sensor 12 is greater than a predetermined spacing value $V_0$ (10 m, for example). The third condition is satisfied if the vehicle speed Vs of the controlled vehicle is higher than a predetermined speed value $V_0$ (10 km/h, for example). From the step S33, the controller 20 proceeds to the step S32 if a preceding vehicle is captured, L is greater than $L_0$ and at the same time Vs is higher than $V_0$, and proceeds to a step S34 if the control cancel condition is not satisfied.

At the step S34, the controller 20 examines whether the controlled vehicle is in the stop state or not, by examining whether the actual vehicle speed Vs is equal to "0" or not. If the controlled vehicle is in the running state and hence the actual vehicle Vs is not equal to "0" (Vs≠0), the controller 20 proceeds to a step S35, and calculates the desired vehicle speed V*(n) according to an equation (3) below.

$$V^*(n) = V^*(n-1) - \alpha_{MAX} \cdot \Delta T \qquad (3)$$

In this equation, V*(n−1) is a previous value of the desired vehicle speed V* determined in the previous control cycle, one cycle before, $\alpha_{MAX}$ is a maximum deceleration which can be achieved by the control, and AT is a timer interrupt period.

Figure 7:
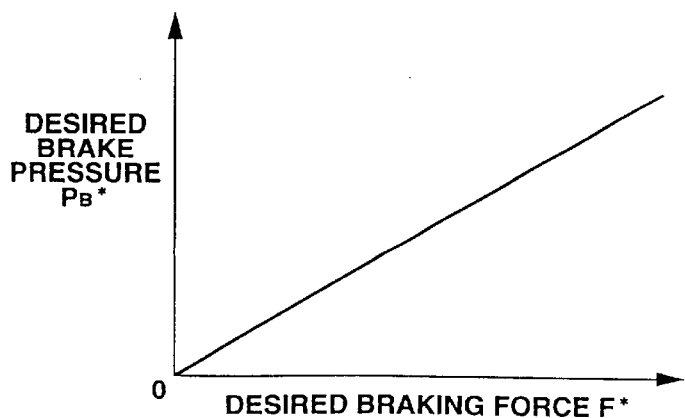
FIG. 7 is a graph showing a relationship between a desired braking force and a desired brake pressure, used in the deceleration mode routine of FIG. 6.

Then, at a next step S36, the controller 20 calculates the desired braking force F* in accordance with the desired vehicle speed V*(n) in the same manner as in the step S29 of the following control procedure. At a step S37 following the step S36, the controller 20 calculates the desired brake pressure $P_B$* from the desired braking force F*. In this example, the desired brake pressure $P_B$* is determined by looking up in a desired brake pressure map representing a relationship between the desired braking force F* and the desired brake pressure $P_B$*, as shown in FIG. 7. After the step S37, the controller 20 proceeds to a step S39.

If the controlled vehicle is in the stop state and hence $V_s=0$, the controller 20 proceeds from the step S34 to a step S38, and sets a maximum brake pressure $P_{MAX}$ as the desired brake pressure $P_B^*$ at the step S38. From the step S38, the controller proceeds to a step S40, and sets the mode indicating flag FG to the NM state indicating the normal mode NM at the step S40. After the step S40, the controller proceeds to the step S39.

At the step S39, the controller 20 delivers the desired brake pressure $P_B^*$ determined at the step S37 or S38, to the brake control unit 8, and then terminates the procedure of FIG. 6.

The procedure of FIG. 5 (specifically the steps S25~S30) corresponds to following control means for performing a preceding vehicle following control, the step S23 corresponds to means for detecting the operation of anti-lock brake control, and the procedure of FIG. 6 (specifically the steps S35~S37) corresponds to deceleration control means for performing a deceleration control.

If the controlled vehicle is running in the normal mode NM without capturing a preceding vehicle, under the control of driver's accelerating and decelerating operation, the following controller 20 reaches the step S3 through the steps S1 and S2, and performs the normal control procedure of FIG. 4. Since the set switch 18 is in the off state, the step S12 is reached and the control system does not perform the control action of outputting the throttle opening θ and the desired brake pressure $P_B^*$.

If the set switch 18 is turned on, the step S13 is reached from the step S11, and the mode indicating flag FG is set to the FM state. Therefore, in a next execution of the control management procedure of FIG. 3, the controller 20 proceeds from the step S2 to the step S4, and performs the following control procedure of FIG. 5.

Since, in this state, a preceding vehicle is not yet captured, the controller 20 proceeds from the step S25 to the step S26, sets the driver's preset vehicle speed $V_{SET}$ as the desired vehicle speed $V^*$, calculates the desired driving/braking force $F^*$ to reduce the deviation of the vehicle speed Vs from the desired vehicle speed $V^*$ at the step S29, calculates the throttle opening θ and the desired brake pressure $P_B^*$ in accordance with the desired driving/braking force $F^*$ at the step S30, and performs the vehicle speed control to maintain the preset vehicle speed $V_{SET}$ by outputting the throttle opening θ and the desired brake pressure $P_B^*$ to the engine output control unit 10 and the brake control unit 8.

If a preceding vehicle is captured, the step S28 is reached through the step S27. Therefore, the controller 20 calculates the desired vehicle speed $V^*$ according to the equation (3) from the desired spacing $L^*$ and the relative speed $\Delta V$ determined at the step S27, and performs the vehicle spacing control to maintain the desired vehicle spacing $L^*$ by controlling the brake control unit 8 and the engine output control unit 10 in accordance with the desired driving/ braking force determined from the desired vehicle speed $V^*$.

If, because of a road surface condition of a low friction coefficient due to ice, snow, rain or some other factor, the preceding vehicle decreases its speed gradually, and hence the vehicle spacing L to the preceding vehicle becomes smaller, then the controller 20 outputs the desired brake pressure $P_B^*$ of a relatively small value to the brake control unit 8 to maintain the desired vehicle spacing $L^*$, and the brake system including the brake actuators 7 brakes the controlled vehicle moderately.

In this case, the brake pressures supplied to the brake actuators 7 are low, and hence the wheel slip rates are still low despite the road surface condition of the low friction coefficient. Therefore, the brake pressure control circuit 9b of the anti-lock brake control unit 9 remains in the inoperative state, the brake control condition signal AB remains at the logic level of "0", and the following control of FIG. 5 continues.

If the preceding vehicle is decelerated hard just before stoppage, and the actual vehicle spacing L decreases, then the control system increases the desired brake pressure $P_B^*$, and accordingly, the brake control unit 8 increases the brake pressures supplied to the brake actuators 7.

This increases the tendency to wheel locking of the wheels 1FL~1RR on the low friction coefficient road surface, and the brake pressure control circuit 9b starts the anti-lock brake control when the wheel slip rate becomes greater than a desired rate value. Thus, the brake control condition signal AB is set to the logic level of "1".

By receiving this brake control condition signal AB, the following controller 20 proceeds from the step S23 to the step S24 in the following control procedure of FIG. 5, and sets the mode indicating flag FG to the DM state for the deceleration mode DM. In a next execution of the control management procedure of FIG. 3, therefore, the following controller 20 proceeds from the step S1 to the step S5 and performs the deceleration control procedure of FIG. 6.

In the deceleration control procedure, the following controller 20 proceeds from the step S33 to the step S34 because the vehicle speed Vs is already lower than the preceding speed value V0 although the preceding vehicle is captured, and the actual vehicle spacing L is greater than the predetermined spacing value Lo. From the step S34, the following controller 20 proceeds to the step S35 because the controlled vehicle is still in the running state. In the steps S35~S39, the following controller 20 performs the deceleration control by determining a new value of the desired vehicle speed $V^*$ by subtraction from the most recent value of the desired vehicle speed $V^*$, of the product obtained by multiplying the maximum deceleration $\alpha_{MAX}$ by the timer interrupt period $\Delta T$, further calculating the desired braking force $F^*$ based on the thus-determined desired vehicle speed $V^*$, and calculating the desired brake pressure $P_B^*$ in accordance with the desired braking force $F^*$. Therefore, the control system determines the desired brake pressure $P_B^*$ corresponding to the decrease quantity of the desired vehicle speed $V^*$, and decelerates the vehicle at a predetermined deceleration.

If the controlled vehicle comes to a stop and the vehicle speed Vs becomes equal to "0", the controller 20 proceeds from the step S34 to the step S38, and sets the maximum brake pressure $P_{MAX}$ as the desired brake pressure $P_B^*$. Therefore, the control system increase the brake pressure for the brake actuators 7 to the maximum level and thereby holds the controlled vehicle in the stop state.

In this way, the control system starts the deceleration control and thereby starts decelerating the controlled vehicle if the anti-lock brake control device 9 is brought to the operative state in a relatively low vehicle speed region. The deceleration control is continued until the controlled vehicle is brought to the stop state. Therefore, even if the deceleration of a preceding vehicle is lowered just before stoppage and increased again, the control system can hold the actual vehicle spacing L at a sufficient level, and does not require a driver's braking operation as in the case of cancellation of the following control during deceleration.

If, in this deceleration control, the driver depresses the brake pedal 16 or turns on the cancel switch 19, then the controller 20 proceeds from the step S31 to the step S32, and changes the control mode from the deceleration mode to the normal mode.

On the other hand, the deceleration control is started if, in the running state on a low friction coefficient road surface in the following control mode at a vehicle speed higher than the predetermined speed value $V_0$, following a preceding vehicle captured, with a vehicle spacing greater than the predetermined spacing value $L_0$, the controlled vehicle is decelerated in response to deceleration of the preceding vehicle, and the brake pressure control circuit $9b$ of the anti-lock brake control unit 9 is put in the operative state. However, in this case, the deceleration control cancel condition is satisfied, and therefore the controller 20 proceeds from the step S33 to the step S32, and changes the control mode from the deceleration mode DM to the normal mode NM. This transition from the deceleration mode to the normal mode does not give the driver unnatural feeling because the vehicle spacing L is relatively large and the vehicle speed Vs is relatively high, and the driver has sufficient time to react.

When the deceleration control is performed in the state of the vehicle spacing L being equal to or smaller than the predetermined spacing value $L_0$, the control system cancels the deceleration mode and changes the control mode to the normal mode if the vehicle spacing L exceeds the predetermined value $L_0$ by acceleration of the preceding vehicle. Similarly when the deceleration control is performed in the state of the vehicle speed being equal to or higher than the predetermined speed value V0, the control system cancels the deceleration mode and changes the control mode to the normal mode if the vehicle spacing L becomes equal to or greater than the predetermined value $L_0$.

When, after the anti-lock brake control unit 9 becomes active, the spacing sensor 12 becomes unable to capture a preceding vehicle due to a lane change of a preceding vehicle, for example, then the control system continues the deceleration control without requiring a river's braking operation until the controlled vehicle comes to a stop.

Thus, when the anti-lock brake control is started in the running state in the following control mode, the control system according to this embodiment continues the deceleration control and brings the controlled vehicle to a stop in a low vehicle speed region or in a small vehicle spacing region. Therefore, this control system can prevent unwanted cancellation of the control against driver's expectation after a start of the anti-lock brake control. Moreover, the control system cancels the deceleration control when the vehicle spacing increases, and by so doing provides vehicle behavior acceptable to the driver.

The present invention is not limited to the laser radar sensor. The vehicle spacing sensor 12 may be a sensor utilizing a millimeter wave radar, or may be an image processing system arranged to calculate the vehicle spacing by processing images produced by a stereo camera having CCD.

In the example of FIG. 1, the automatic transmission 3 is on the output side of the engine 2. However, the present invention is not limited to this arrangement. The present invention is applicable to a vehicle having a continuously variable transmission.

The present invention is not limited to the hydraulic brake system. The present invention can employ an electric motor as the brake actuators 7. In this case, the control system can control the brake application force by controlling the electric signals to the electric brake actuators 7. Moreover, the present invention is applicable to a system arranged to produce a regenerative braking force with an electric motor as in an electric vehicle.

The present invention is applicable not only to a rear wheel driver vehicle, but to a front wheel drive vehicle or a four wheel drive vehicle. Furthermore, the present invention is applicable to an electric vehicle having an electric motor instead of the engine 2 and a hybrid vehicle having an electric motor in addition to the engine 2. In this case, the control unit 10 may be arranged to control the electric motor.

This application is based on a prior Japanese Patent Application No. 11(1999)-204274. The entire contents of this Japanese Patent Application No. 11(1999)-204274 with a filing date of Jul. 19, 1999 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A preceding vehicle following control apparatus for controlling a controlled vehicle, the vehicle following control apparatus comprising:

a vehicle speed sensor to sense an actual vehicle speed of the controlled vehicle;

a vehicle spacing sensor to sense actual vehicle spacing from the controlled vehicle to a preceding vehicle;

a vehicle speed controller to vary the actual vehicle speed of the controlled vehicle in accordance with a desired vehicle speed;

an anti-lock brake controller to perform an anti-lock brake control for preventing wheel locking; and a vehicle speed controller to determine the desired vehicle speed in accordance with the actual vehicle speed and the actual vehicle spacing, the controller comprising, a following control section to perform a preceding vehicle following control by setting a desired vehicle spacing from the controlled vehicle to a preceding vehicle in accordance with the actual vehicle speed and actual vehicle spacing and determining the desired vehicle speed to bring actual vehicle spacing closer to desired spacing, a deceleration control section to perform a deceleration control determining the desired vehicle speed to decrease the actual vehicle speed of the controlled vehicle, and a mode change control section to cancel the following control of the following control section and instead compulsorily initiating the deceleration control of the deceleration control section in response to a start of the anti-lock brake control of the anti-lock brake controller.

2. The preceding vehicle following control apparatus as claimed in claim 1, wherein the mode change control section of the vehicle speed controller cancels the following control of the following control section and instead allows the deceleration control section to start the deceleration control if one of first and second conditions is met during the anti-lock brake control of the anti-lock brake controller, the first condition being met if the vehicle speed of the controlled vehicle is equal to or lower than a predetermined speed value, the second condition being met if actual vehicle spacing is equal to or smaller than a predetermined spacing value.

3. The preceding vehicle following control apparatus as claimed in claim 1, wherein the mode change control section of the vehicle speed controller cancels the following control of the following control section and instead allows the deceleration control section to start the deceleration control if the actual vehicle spacing is equal to or smaller than a predetermined spacing value during the anti-lock brake control of the anti-lock brake controller, and the mode change control section allows the deceleration control section to continue the deceleration control until one of first and second conditions is met, the first condition being met if actual vehicle spacing is greater than the predetermined spacing value, the second condition being met if the controlled vehicle is in a stop state.

4. The preceding vehicle following control apparatus as claimed in claim 1, wherein the mode change control section of the vehicle speed controller cancels the following control of the following control section and instead allows the deceleration control section to start the deceleration control if the actual vehicle speed is higher than a predetermined speed value and actual vehicle spacing is equal to or smaller than a predetermined spacing value during the anti-lock brake control of the anti-lock brake controller, and the mode change control section allows the deceleration control section to continue the deceleration control until actual vehicle spacing become greater than the predetermined spacing value.

5. The preceding vehicle following control apparatus as claimed in claim 1, wherein the mode change control section of the vehicle speed controller cancels the following control of the following control section and instead allows the deceleration control section to start the deceleration control if the actual vehicle speed is equal to or lower than a predetermined speed value during the anti-lock brake control of the anti-lock brake controller, and the mode change control section causes the deceleration control section to continue the deceleration control until the controlled vehicle comes to a stop state.

6. The preceding vehicle following control apparatus as claimed in claim 1, wherein the mode change control section cancels the following control of the following control section and instead allows the deceleration control section to start the deceleration control if the anti-lock brake control of the anti-lock brake controller is started, and the mode change control section causes the deceleration control section to continue the deceleration control until the controlled vehicle comes to a stop state.

7. The preceding vehicle following control apparatus as claimed in claim 1, wherein the mode change control section is configured to produce an anti-lock brake control detection signal when the anti-lock brake control of the anti-lock brake controller is detected, and to change a control mode from a following mode for performing the following control, to a deceleration mode for performing the deceleration control, in response to the anti-lock brake control detection signal.

8. The preceding vehicle following control apparatus as claimed in claim 1, wherein, if actual vehicle spacing is smaller than or equal to a predetermined spacing value or if the actual vehicle speed is lower than or equal to a predetermined speed value, the mode change control section of the vehicle speed controller causes the deceleration control section to continue the deceleration control) until the controlled vehicle comes to a stop state.

9. The preceding vehicle following control apparatus as claimed in claim 1, wherein the deceleration control section continues the deceleration control until actual vehicle spacing becomes greater than a predetermined spacing value or the controlled vehicle is put in a stop state.

10. The preceding vehicle following control apparatus as claimed in claim 1, wherein, when the actual vehicle speed is higher than a predetermined speed value, the deceleration control section continues the deceleration control as long as the actual vehicle spacing is equal to or lower than a predetermined spacing value, and cancels the deceleration control if the actual vehicle spacing becomes greater than the predetermined spacing value.

11. The preceding vehicle following control apparatus as claimed in claim 1, wherein, when the actual vehicle speed is lower than or equal to a predetermined speed value, the deceleration control section continues the deceleration control until the controlled vehicle comes to a stop state.

12. The preceding vehicle following control apparatus as claimed in claim 1, wherein the deceleration control section of the vehicle speed controller starts the deceleration control in response to a start signal, and terminates the deceleration control in response to an end signal, and the mode change control section of the vehicle speed controller produces the start signal when the anti-skid brake control is started during the following control, and produces the end signal by monitoring the actual vehicle spacing, the vehicle speed of the controlled vehicle and a driver's intervention.

13. A preceding vehicle following control apparatus for controlling a controlled vehicle, the vehicle following control apparatus comprising:
  means for detecting an anti-lock brake control operation for preventing wheel locking of the controlled vehicle;
  means for performing a vehicle following control for reducing a deviation of a sensed actual vehicle spacing from the controlled vehicle to a preceding vehicle, from a desired vehicle spacing;
  means for performing a deceleration control for automatically decelerating the controlled vehicle; and
  means for compulsorily starting the deceleration control when the anti-lock brake control is detected in the following control.

14. A preceding vehicle following control process for controlling a controlled vehicle, the vehicle following control process comprising:
  detecting an anti-lock brake control operation for preventing wheel locking of the controlled vehicle;
  performing a vehicle following control for reducing a deviation of a sensed actual vehicle spacing from the controlled vehicle to a preceding vehicle, from a desired vehicle spacing when the anti-lock brake control operation is not detected; and
  compulsorily switching to a deceleration control for automatically decelerating the controlled vehicle when the anti-lock brake control operation is detected.

15. The preceding vehicle following control process as claimed in claim 14, further comprising allowing the deceleration control when the sensed actual vehicle spacing is smaller than or equal to a predetermined spacing value.

* * * * *